US010313137B2

(12) United States Patent
Aarnio et al.

(10) Patent No.: US 10,313,137 B2
(45) Date of Patent: Jun. 4, 2019

(54) METHOD FOR AUTHENTICATING DEVICES IN A MEDICAL NETWORK

(71) Applicant: General Electric Company, Schenectady, NY (US)

(72) Inventors: Lauri Tapio Aarnio, Helsinki (FI); Ville Vartiovaara, Helsinki (FI); Antti Paila, Helsinki (FI)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 15/349,411

(22) Filed: Nov. 11, 2016

(65) Prior Publication Data

US 2018/0013571 A1 Jan. 11, 2018

Related U.S. Application Data

(60) Provisional application No. 62/358,362, filed on Jul. 5, 2016.

(51) Int. Cl.
*H04L 9/32* (2006.01)
*H04L 9/06* (2006.01)

(52) U.S. Cl.
CPC .......... *H04L 9/3271* (2013.01); *H04L 9/0643* (2013.01); *H04L 9/3236* (2013.01)

(58) Field of Classification Search
CPC ..................... H04L 9/3271; H04L 9/3236
USPC ....................................................... 713/168
See application file for complete search history.

(56) References Cited

U.S. PATENT DOCUMENTS

| 7,096,359 | B2 | 8/2006 | Agrawal et al. |
| 7,171,555 | B1 * | 1/2007 | Salowey ............... H04L 9/3271 713/156 |
| 7,194,763 | B2 | 3/2007 | Potter et al. |
| 7,840,805 | B2 | 11/2010 | Maillard et al. |

(Continued)

FOREIGN PATENT DOCUMENTS

| DE | 102010010760 A1 | 9/2011 |
| WO | 2011116589 A1 | 9/2011 |

OTHER PUBLICATIONS

JeongGil Ko, MEDiSN: Medical Emergency Detection in Sensor Networks; ACM:2008; p. 1-2.*

*Primary Examiner* — Monjur Rahim
(74) *Attorney, Agent, or Firm* — Dean D. Small; The Small Patent Law Group, LLC

(57) ABSTRACT

A computer implemented method and system are provided for verifying authenticity of a medical component endpoint. The method is under control of one or more computer systems configured with specific executable instructions. The method receives, at a local medical equipment (LME) node, a cipher message combination that includes a challenge and a corresponding valid response, the LME node is unable to independently calculate the valid response. The method conveys the challenge, from the LME node, to a medical component endpoint that includes an authentication circuit, receives a candidate response from the component endpoint, where the candidate response is generated by the authentication circuit based on the challenge and determines whether the candidate response matches the valid response from the corresponding cipher message combination. The method further authenticates the component endpoint based on whether the candidate and valid responses match.

20 Claims, 9 Drawing Sheets

(56) References Cited

U.S. PATENT DOCUMENTS

| | | | |
|---|---|---|---|
| 9,031,050 B2* | 5/2015 | Cherian | H04L 63/18 |
| | | | 370/338 |
| 2006/0026671 A1* | 2/2006 | Potter | H04L 63/08 |
| | | | 726/7 |
| 2007/0022469 A1 | 1/2007 | Cooper et al. | |
| 2007/0113073 A1* | 5/2007 | Maillard | H04N 5/913 |
| | | | 713/156 |
| 2008/0263647 A1 | 10/2008 | Barnett et al. | |
| 2014/0047242 A1 | 2/2014 | Ukil et al. | |
| 2016/0330573 A1* | 11/2016 | Masoud | H04W 4/90 |

* cited by examiner

METHOD FOR AUTHENTICATING DEVICES IN A MEDICAL NETWORK

CROSS-REFERENCE TO RELATED APPLICATIONS

The present application claims priority to U.S. Provisional Application No. 62/358,362, filed Jul. 5, 2016, entitled "METHOD FOR AUTHENTICATING DEVICES IN A MEDICAL NETWORK," the entire subject matter of which is incorporated by reference herein.

BACKGROUND

The subject matter herein relates generally to methods and systems for equipment authentication within a medical network, and more particularly to authenticating remote medical component endpoints utilizing secure symmetric device-specific keys.

Healthcare facilities utilize a variety of electronic equipment in connection with diagnosis, treatment, patient monitoring and other patient related healthcare services. Various types of medical electronic equipment utilize sensors, actuators and the like, generally referred to as component endpoints, that detect various types of information and perform various actions. For example, a medical component endpoint may represent a wearable sensor placed on a patient, an equipment or physiologic sensor within a life-support system, and the like. As one example, the component endpoints may convey sensor data to patient monitoring equipment. Over time component endpoints need to be replaced more often than other parts of the medical electronic equipment. For example, the leads for a patient monitor may break, while the remainder of the patient monitoring equipment operates properly. Also, additional component endpoints are added to equipment over time, such as when a new system is set up or at later points in operation.

It is desirable to verify the authenticity of component endpoints that control operation of medical electronic equipment, and/or generate data and other information regarding patients and the medical electronic equipment. Authentication of monitoring equipment is desirable to ensure compatibility with other medical electronic equipment, reliability of measured data, proper operation of the medical equipment, as well as for other reasons.

One conventional technique for authenticating component endpoints includes providing the medical electronic equipment (e.g., patient monitor) with a public encryption key that matches an encryption key within the component endpoints. Public key encryption uses the public key of the receiver to encrypt the content of the message, and is another method for protecting the contents of a digital transmission. The sender can utilize the receiver's public key to encrypt the data. After the message is transmitted to the receiver, the receiver can use the secret key to decrypt the message. The medical electronic equipment and component endpoint utilize the common public encryption key to communicate with one another and as a verification that the component endpoint is a valid component authorized for use with the medical electronic equipment.

However, anyone in possession of a receiver's key could send information to the receiver, resulting in an undesirable outcome. Storing secret encryption keys on medical electronic equipment at a health care facility renders the keys susceptible to theft, discovery, or improper access by third parties. When an encryption key is compromised, unauthorized reproduction of the secret encryption key may occur for use on unauthorized component endpoints.

Further, while patient monitors or other medical electronic equipment are generally maintained in a secure environment, a risk still exists that the encryption keys may be discovered. For example, conventional authentication methods may utilize a global cipher message combination for multiple patient monitors and sensors within the network, meaning that each patient monitor and/or sensor shares the same key. Access to the key from an unauthorized user potentially compromises the entire network along with patient data. Also, device and/or sensor specific keys for authentication require key management that is tailored to avoid situations where a counterfeit device or sensor could respond correctly to authentication queries if blank or unused keys are available. The foregoing scenarios are undesirable.

A need remains for improved authentication systems and methods for component endpoints utilized in connection with medical networks.

BRIEF DESCRIPTION

In accordance with embodiments herein, a computer implemented method for verifying authenticity of a medical component endpoint is provided. The method is under control of one or more computer systems configured with specific executable instructions. The method receives, at a local medical equipment (LME) node, a cipher message combination that includes a challenge and at least one of a corresponding valid response or a hash function code (HFC) of a valid response, the LME node is unable to independently calculate the valid response. The method conveys the challenge, from the LME node, to a medical component endpoint that includes an authentication circuit, receives a candidate response from the component endpoint, where the candidate response is generated by the authentication circuit based on the challenge and determines whether the candidate response matches the valid response from the corresponding cipher message combination. The method further authenticates the component endpoint based on whether the candidate and valid responses match.

Optionally, the component endpoint may include at least one of a patient monitoring sensor, an equipment sensor, or an equipment actuator. The method may further generate a set of cipher message combinations at a trusted authentication computing device located remote from the LME node. The trusted authentication computing device may include an original authentication circuit that emulates the operation of the authentication circuit at the component endpoint. The method may restrict access to the authentication circuit to component endpoint and a trusted authentication computing device. The method may receive measurement data from the component endpoint. The measurement data may be indicative of a patient characteristic of interest and may authenticate the measurement data based on whether the candidate response matches the valid response of the cipher message combinations.

Optionally, the method may further log the measurement data prior to authentication. For a period of time, the measurement data may be authenticated after the logging operation. The candidate response may represent a response hash code that is calculated based on a response key generated by the authentication circuit. The method may transmit, from the component endpoint, a connection request and serial number to at least one of the LME node or a local medical network computing device during a registration sequence. The method may register the LME node with a trusted authentication (TA) computing device, the TA computing device may provide the cipher message combination to the LME node.

In accordance with embodiments herein, a system for verifying authenticity of a medical component endpoint is provided. The system comprises an input/output (I/O) interface that is configured to be coupled to a medical component endpoint configured to perform at least one of: i) collect measurement data and ii) perform actions based on incoming operation commands. The system comprises memory configured to store a cipher message combination that includes a challenge and a corresponding valid response. The valid response corresponds to a calculation performed by an authentication circuit based on the challenge. One or more processors are configured with specific executable instructions to convey the challenge to the component endpoint that includes an authentication circuit. The authentication circuit receives a candidate response from the component endpoint, determines whether the candidate response matches the valid response from the corresponding cipher message combination and authenticates the component endpoint based on whether the candidate and valid responses match, wherein the one or more processors are unable to independently calculate the valid response.

Optionally, the system may further comprise a component endpoint that may represent at least one of a patient monitoring sensor, an equipment sensor, or an equipment actuator. A trusted authentication computing device may be configured to generate the cipher message combination. The trusted authentication computing device may be located remotely from the one or more processors. The trusted authentication computing device may include an original authentication circuit that may emulate the operation of an authentication circuit at a valid component endpoint. The system further comprises a trusted authentication computing device and a valid component endpoint, which may include a common authentication circuit. The memory and one or more processors may be housed within a local medical equipment (LME) node that does not have an authentication circuit corresponding to the common authentication circuit in the component endpoint and a trusted authentication computing device.

Optionally, the component endpoint may not have an authentication circuit, where the authentication circuit represents a microprocessor executing an authentication software algorithm rather than a firmware solution.

Optionally, the one or more processors may further be configured to receive measurement data from the component endpoint, the measurement data being indicative of a patient characteristic of interest, and authenticate the measurement data based on whether the candidate response matches the valid response of the cipher message combinations. The one or more processors may further be configured to log the measurement data, prior to authentication, for a period of time, the measurement data being authenticated after the logging operation.

The one or more processors may further be configured to receive, from the component endpoint, a connection request and serial number during a registration sequence. The one or more processors may further be configured to further comprise registering an LME node with a trusted authentication (TA) computing device. The TA computing device may provide the cipher message combination to the LME node. The LME node may include one or more processors and memory.

DETAILED DESCRIPTION

Figure 1:
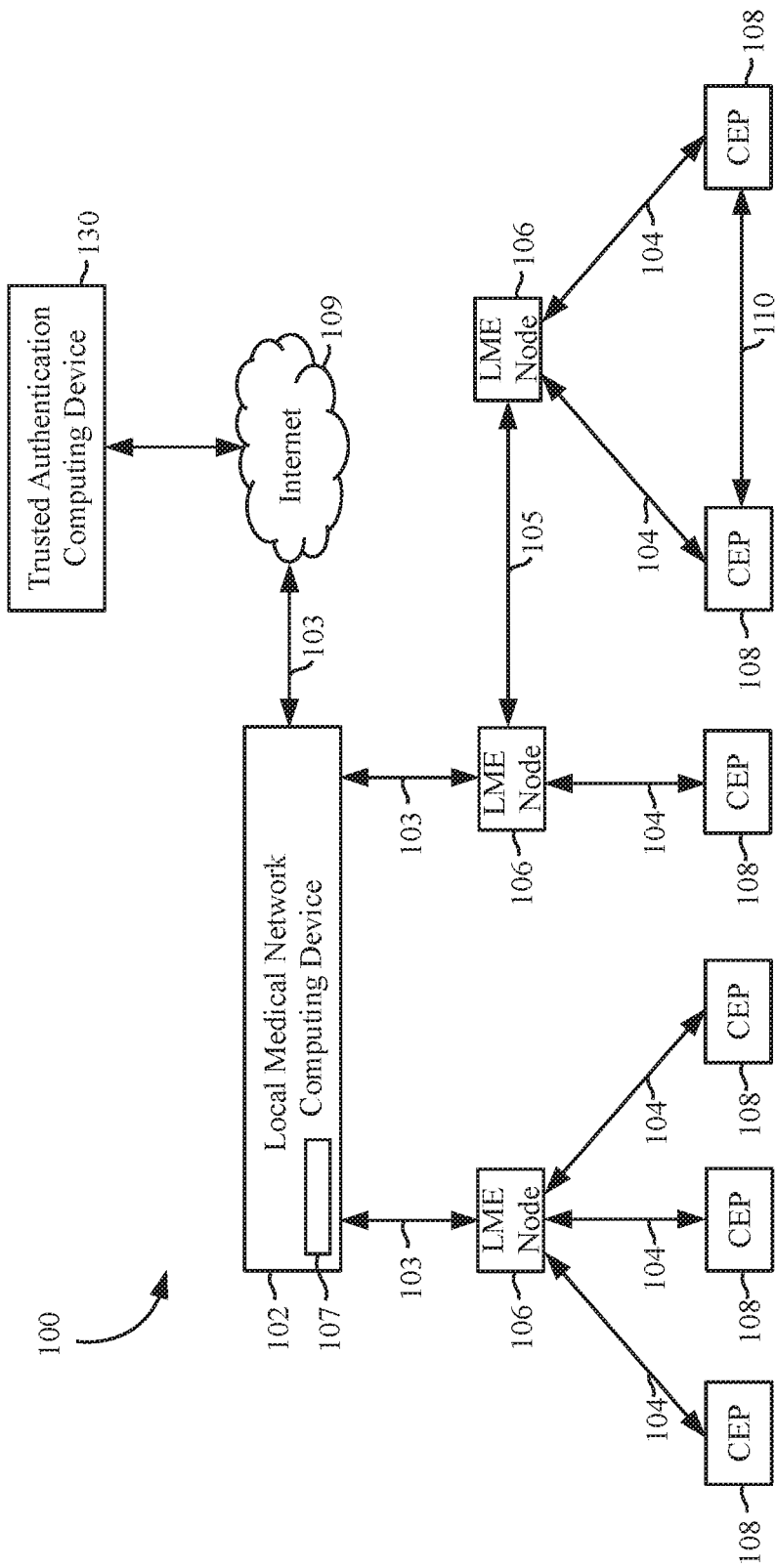
FIG. 1 is a block diagram of an exemplary medical network formed in accordance with embodiments herein.

The following detailed description of certain embodiments will be better understood when read in conjunction with the appended drawings. To the extent that the FIGS. illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments described herein include systems and methods for authenticating remote medical component endpoints. A medical network may include a plurality of local medical equipment (LME) nodes that are communicatively coupled downstream to one or more remote medical component endpoints and/or one or more other LME nodes. Each component endpoint may represent a measurement component that collects measurement data, such as measurement data corresponding to a series of physiological measurements (e.g., cardiac activity, temperature, breathing rate, and/or the like) of a patient. Additionally or alternatively, the component endpoint may measure or monitor therapeutic events, such as drug delivery, IVs and other therapy related activities. Additionally or alternatively, the component endpoint may monitor a state or status of the LME node. Additionally or alternatively, the component endpoint may represent an actuator, switch, valve, and the like on an LME node.

The LME nodes are communicatively coupled upstream to a trusted authentication computing device, which is located remotely from the local medical network. Optionally, one or more local medical network (LMN) computing devices may be communicatively coupled between the LME nodes and the trusted authentication computing device. The trusted authentication computing device generates and manages distribution of cipher message combinations to the LMN computing devices and/or LME nodes.

A technical effect of various embodiments is to verify the authenticity of component endpoints through management of cipher message combinations. The cipher message combinations include a challenge and at least one of a corresponding valid response or an HFC of a valid response. The challenges are generated at the trusted authentication computing device and the responses are calculated at the trusted authentication computing device, based on the challenge and one or more private encryption keys.

In accordance with embodiments herein, at least one technical effect is to provide an authentication method and system that limits distribution of authentication circuits and encryption keys to the medical component endpoints and the trusted authentication computing device. Device specific encryption keys are embedded within the authentication circuits in the component endpoints. The encryption keys and authentication circuits are embedded within the component endpoints and match encryption keys and authentication circuits maintained at the trusted authentication computing device. The encryption keys are not distributed to any other intermediate "public" equipment or servers provided along a communications path between the component endpoints and trusted authentication computing device. Examples of "public" equipment and servers include patient monitors (or similar LME node), and local servers (or other local medical network) that are provided as intermediate nodes to carry and store measurement data and other information to and from the component endpoints. The authentication methods and systems described herein prevent distribution of the encryption keys to any public equipment and servers.

In accordance with various embodiments, the cipher management methods and systems avoid exposure of the secret encryption keys or authentication circuit to medical facilities at any time, whether during setup of a LME node, replacement of a component endpoint, installation of a medical network or otherwise. Exposure of the encryption keys is avoided, even when component endpoints are not directly connected to the trusted authentication computing device (e.g., a trusted server) that is maintained remotely from the local medical network. The LME nodes and/or local medical network computing devices are devoid of the encryption keys and are devoid of authentication circuits that would otherwise utilize the encryption keys. Instead, the LME nodes and/or local medical network computing devices are provided only with the cipher message combinations. The LME nodes and/or local medical network computing devices are not provided with a manner of independently calculating responses within the cipher message combinations. The LME nodes and/or local medical network computing devices determine whether individual component endpoints are authenticate based on matches between the cipher message combinations and candidate responses returned from the component endpoints. The LME nodes and/or local medical network computing devices authenticate individual component endpoints without utilizing authentication circuits and/or encryption keys.

By authenticating component endpoints, embodiments herein avoid operation of the system with "counterfeit," "fake," or otherwise un-authorized component endpoints. Preventing use of un-authorized component endpoints affords various benefits, such as improving patient safety and maintaining a reliable customer-supplier business relationship. In addition, in the event of an accident or other problem, patient measurement data and system operation may be checked through data logs and patient records, even when a component endpoint is not validated when activated.

FIG. 1 is a block diagram of an exemplary medical network 100 formed in accordance with an embodiment herein. The medical network 100 includes one or more trusted authentication computing devices (CDs) 130 that is bi-directionally coupled to one or more local medical networks over a link 103, such as the Internet 109.

The medical network 100 includes one or more local healthcare (LME) computing devices 106, also referred to as nodes, communicatively coupled along a bi-directional communication link 103 to a local medical network computing device 102. For example, the LME nodes 106 may represent patient monitors, life-support devices (e.g., an anesthesia delivery device, or a ventilation device), an infusion pump, and the like. The network computing device 102 may represent a local or cloud-based network server, workstation and the like. The LME nodes 106 may form a bi-directional communication link 105 with each other. The communication links 103 and 105 allow the one or more LME nodes 106 to transmit and/or receive information within the medical network 100 with other LME nodes 106.

The LME nodes 106 connect, through wired or wireless links 104, with remote medical component endpoints 108. By way of example, the component endpoints 108 may represent patient monitoring sensors, other types of wearable sensors, actuators, switches and the like. For example, when used in connection with a patient monitor, the component endpoints 108 may represent ECG sensors, respiration sensors, impedance sensors, pulse oximetry sensors, drug delivery sensors, blood pressure sensors, etc. As another example, the component endpoints 108 may represent actuators, such as used in connection with a life-support system, an infusion pump and the like. The component endpoints 108 generate various types of measurement data, such as physiologic data indicative of one or more physiologic characteristics of a patient of interest. The measurement data may represent the status or state of one or more features of a life-support system, infusion pump or other equipment, such as a valve position/state, a rate of operation, a delivery rate, a delivery volume, etc.

In various embodiments, the LME nodes 106 correspond to access points configured to receive, process, store and/or access the measurement data generated by one or more component endpoints 108. The component endpoints 108 communicatively couple along a bi-directional communication link 104 to a corresponding LME node. Optionally, two or more component endpoints 108 communicatively couple directly with each other along a bi-directional communication link 110.

The bi-directional communication links 103-105, 110 allow data to be exchanged between the trusted authentication CD 130, LME nodes 106, LMN computing device 102, and component endpoints 108. For example, the links 103-105, 110 may be based on a wired and/or wireless network protocol (e.g., Wireless Medical Telemetry Service, Medical Body-Area Network, WiFi, 802.11, Bluetooth low energy, Bluetooth, Ethernet, and/or the like), optical communication (e.g., optical fiber, LED pulses, and/or the like), mechanical communication (e.g., pulsed vibrations), and/or the like.

The local medical network computing device 102 may represent a standard server, workstation or other computer operating at or in connection with a medical facility. The computing device 102 implements software and/or firmware 107 that is provided in connection with communication with the trusted authentication computing device 130 and nodes 106. The computing device 102 in general is not considered a "trusted" computing device as access to, and operation of, the computing device 102 is not controlled by the same users or entity that operate and control the trusted authentication computing device 130. Hence, the computing device 102 is not necessarily tamper resistant and does not store encryption keys or authentication circuits, as utilized by the trusted authentication computing device 130 and the component endpoints 108.

The LME nodes 106 may represent "hubs" as each LME node represents a local collection point for incoming data, outgoing data and outgoing operation commands for multiple component endpoints 108. The LME nodes 106 may be considered somewhat tamper resistant, but are still not suitable for storing encryption keys, nor installing authentication circuit's thereon. The component endpoints 108 are equipped with authentication chips or circuits which contain encryption keys that are programmed for the corresponding authentication circuit (e.g., at the time of manufacture while in a secure environment). Additionally or alternatively, the component endpoints 108 may be equipped with an authentication circuit that comprises a microprocessor running software that performs the authentication process. As explained herein, the LME nodes periodically or randomly authenticate component endpoints 108. To do so, the LME node 106 sends a "challenge" to the component endpoints 108. The component endpoint 108 returns a response which is used by the LME node 106 to check the authenticity of the component endpoint 108.

As explained herein, the LME nodes 106 perform the authentication operation without knowledge of the encryption keys or authentication circuit used to generate responses from challenges. In accordance with embodiments herein, there is no need to distribute encryption keys to the LME nodes as the LME nodes are provided with pre-calculated valid responses that are uniquely associated with challenges. For example, the combinations of challenges and valid responses may be generated during the registration process while registering an LME node.

Figure 2A:
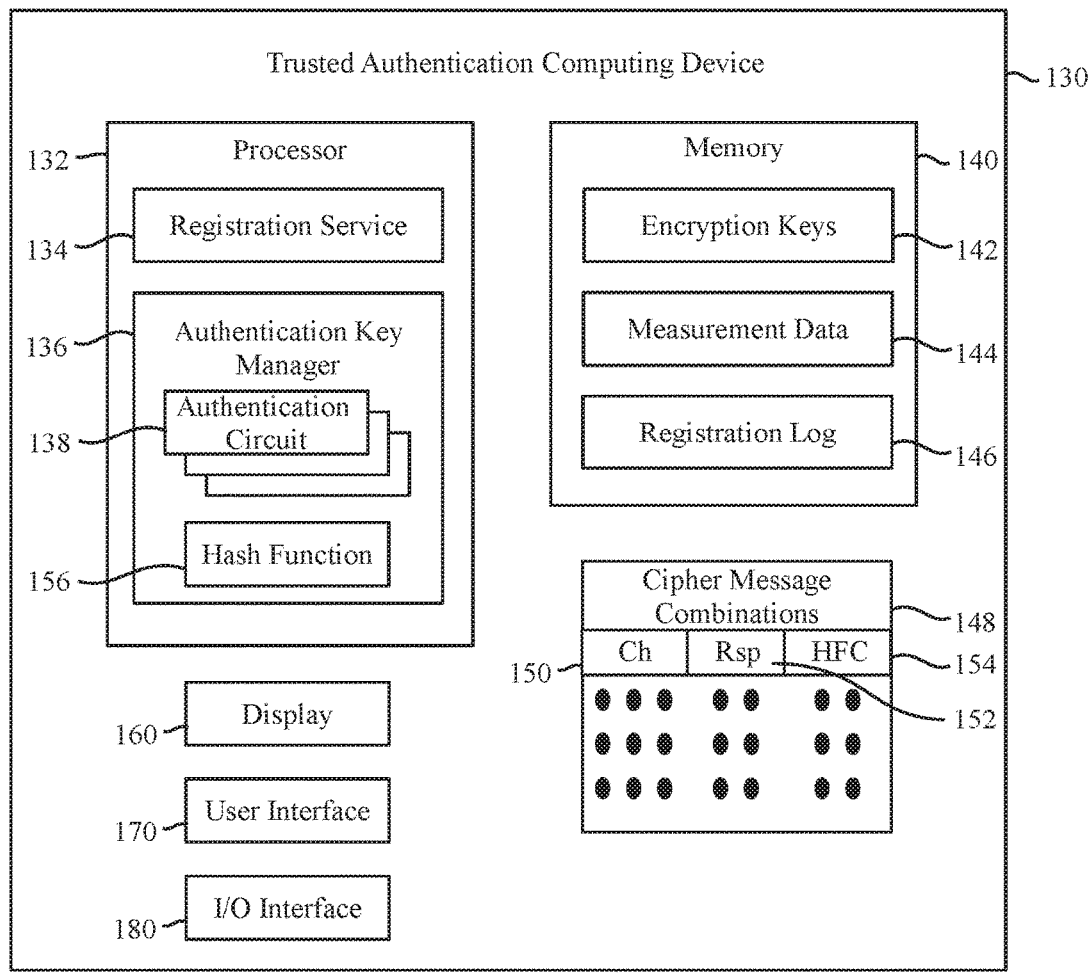
FIG. 2A illustrates a block diagram of a trusted authentication computing device (CD) formed in accordance with an embodiment herein.

FIG. 2A illustrates a block diagram of a trusted authentication computing device (CD) 130 formed in accordance with an embodiment herein. The trusted authentication CD 130 may be owned, managed, controlled or otherwise operated by a medical equipment manufacturer, provider, distributor and the like. The trusted authentication CD 130 may represent one or more servers that are configured to monitor and provide operational support to local medical facilities and networks. In accordance with embodiments herein, the trusted authentication CD 130 may be configured to set up, maintain, update and generally monitor operation of local medical networks. The trusted authentication computing device 130 may represent an authentication server that maintains a database of, among other things, component endpoint 108 serial numbers, LME node 106 serial numbers, encryption keys, authentication circuit identifiers, and the like.

The trusted authentication computing device includes memory 140, a display 160, user interface 170 and I/O interfaces 180. The display 160 and user interface 170 enable an operator to manage and control operation of the trusted authentication computing device 130. The I/O interface 180 may include input/output ports, transceivers, and other communications electronics utilized to facilitate communication over wired and wireless connections. The memory 140 stores measurement data 144. The trusted authentication computing device 130 includes one or more processors 132 that operate program instructions stored in memory to implement various functions including, but not limited to, a registration service 134 and an authentication key manager 136.

The registration service 134 is configured to register new equipment that is implemented at local medical networks. For example, the registration server 134 will register each new LMN computing device 102, each LME node 106, and each component endpoint 108, among other things. The registration service 134 maintains a registration log 146 in memory 140 that tracks each piece of equipment registered in connection with a local medical network. For example, the registration service 134 maintains records (within the registration log 146) concerning the equipment connected to a local medical network. The records may contain general information regarding an overall medical network. Additionally or alternatively, the records may be specific to subsystems within the local medical network, such as servers, workstations, departments within a medical facility, and the like. Additionally or alternatively, the records may be device specific records regarding computing devices, component endpoints 108, and other medical equipment installed at one or more local medical facilities or networks. By way of example, a separate record may be maintained for each local medical network, each local medical equipment node, each component endpoint 108, and the like. A record may include a unique identifier (ID), hardware and software version information, configuration information, technical specifications, MAC address, and the like for the associated equipment. The registration service 134 may generate a new device specific record (or update a local network record) when a piece of equipment is added (e.g., registered) to the local medical network.

The authentication keys manager 136 includes one or more authentication circuits 138 that are configured to generate cipher message combinations 148. The cipher message combinations 148, as explained herein, are used by the local medical network to verify the authenticity of component endpoints 108 that are connected to the local medical network. A cipher message combination 148 includes a challenge 150 and at least one of a corresponding valid response 152 and/or an HFC 154 for the valid response. For example, a challenge 150 may represent a random number or character string generated by the authentication key manager 136. The challenge 150 may have different lengths (e.g., 256 bits). Optionally, the challenge 150 may represent predetermined numbers, words, phrases, and the like. The valid response 152 is calculated by the authentication circuit 138 by applying an encryption key 142 to the corresponding challenge 150. The valid response 152 represents an encrypted form of the challenge 150, where the encryption technique is determined by the authentication circuit 138 while applying a corresponding encryption key 142. Optionally, the valid response 152 are calculated by a microprocessor executing an authentication software algorithm, applying an encryption key 142 to the corresponding challenge 150. The valid response 152 represents an encrypted form of the challenge 150, where the encryption technique is determined by a microprocessor executing an authentication software algorithm, applying a corresponding encryption key 142.

Additionally or alternatively, a hash response code 154 may be calculated in connection with each valid response 152. The hash response code 154 represents a code calculated by applying a predetermined hash function to a response (has been calculated by the authentication circuit 138). Optionally, the hash function code 154 for a valid response may calculated by a microprocessor executing an authentication software algorithm. The authentication key manager 136 may calculate the hash response codes 154 based on one or more predetermined hash functions 156.

Figure 2B:
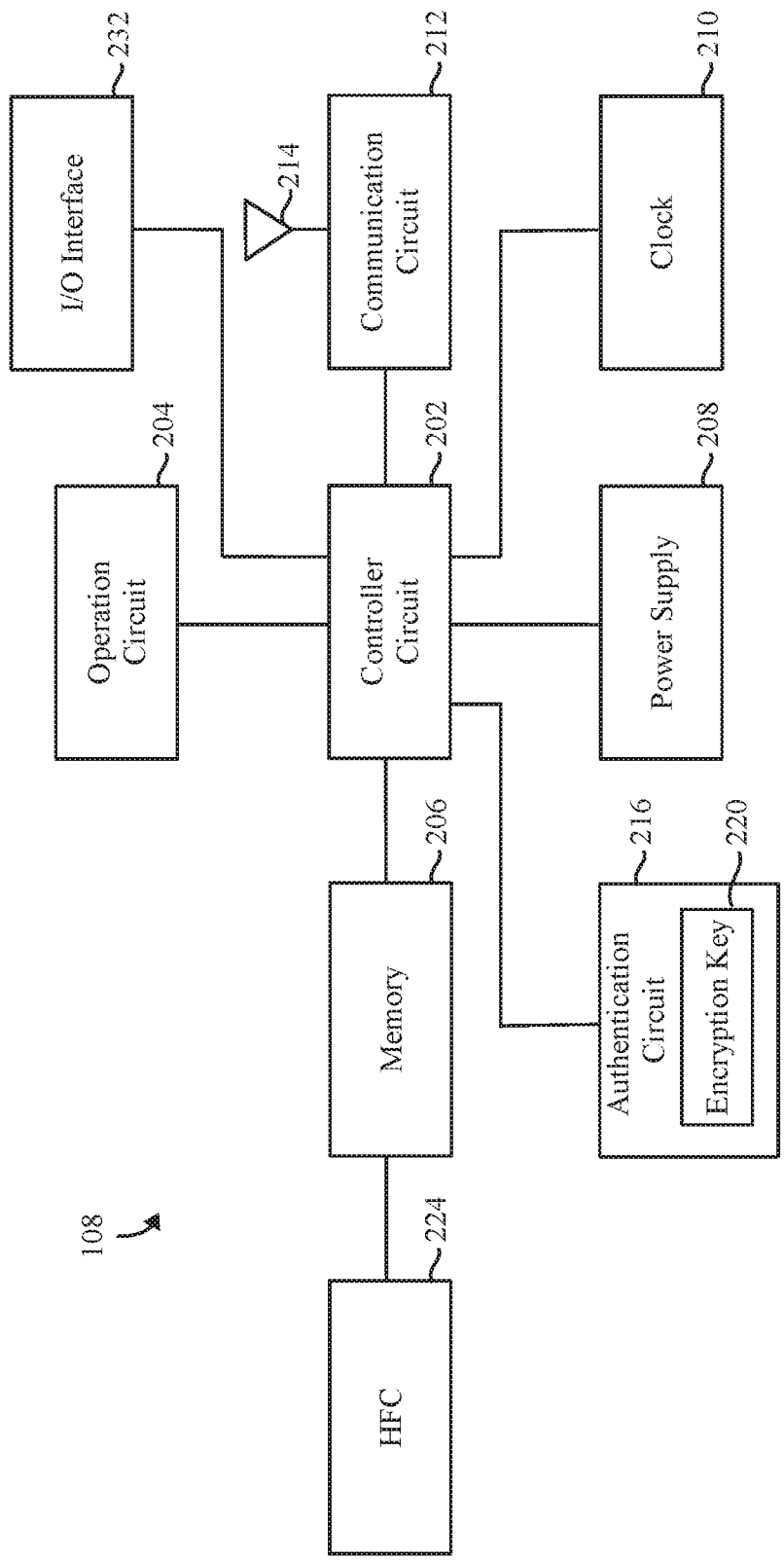
FIG. 2B is a schematic block diagram of a component endpoint formed in accordance with embodiments herein.

FIG. 2B is a schematic block diagram of a component endpoint 108 formed in accordance with embodiments herein. The component endpoint 108 is configured to generate measurement data based on an operation circuit 204. The nature and content of the measurement data varies based on the structure and purpose of the component endpoint 108. For example, the component endpoint 108 may operate as a sensor to measure one or more physiologic characteristics of a patient (e.g., ECG signals, heart rate, blood pressure, respiratory rate, pulse oximetry levels, neurological signals, or brainwave activity). For example, the component endpoint 108 may represent a physiological sensor (e.g., electrocardiograph (ECG) sensor, electroencephalograph (EEG), a pulse oximeter, blood pressure monitor, and/or the like) positioned proximate to and/or in contact with a patient, an environmental sensor (e.g., gas sensor, a temperature sensor, and/or the like), a speed sensor, and/or the like.

Additionally or alternatively, the component endpoint 108 may operate as a equipment sensor to monitor one or more operational states of medical equipment (e.g., an on/off state of an infusion pump, life-support system, anesthesia machine, ventilator). The component endpoint 108 may operate as a sensor to monitor flow rates of medical equipment (e.g., flow rate for a fluid delivery system, drug delivery system, or oxygen flow). As another example, the component endpoint 108 may operate as a therapeutic device, a medical indicator and/or the like.

Additionally or alternatively, the component endpoint 108 may represent an actuator, switch, valve, or other electromechanical component of a therapeutic device such as a ventilator, neuro-stimulator, infusion pump, and/or the like. When the component endpoint 108 represents an electromechanical component, the operation circuit 204 performs an action based upon instructions received through the I/O interface 232.

The operation circuit 204 may include one or more amplifiers, multiplexed amplifiers, thermistors, transducers, and/or the like configured to generate an electrical signal. For example, the operation circuit 204 of a sensor type component endpoint 108 may generate measurement data (e.g., electrical signal) representing changes in the environment detected by the operation circuit 204. In another example, the operation circuit 204 of a therapeutic type component endpoint 108 may generate measurement data corresponding to therapeutic information (e.g., level of stimulation, anatomy stimulated, or type of stimulation) based on stimulation of the patient generated by the operation circuit 204. The component endpoint 108 may include a power supply 208, such as a battery (e.g., lithium-ion battery), solar cell, and/or the like. The power supply 208 is configured to provide electrical power (e.g., current, voltage) to the components of the component endpoint 108.

The operation circuit 204 is operably coupled to a controller circuit 202, which receives the electrical signal. The controller circuit 202 is configured to control the functions and/or operation of the component endpoint 108. The controller circuit 202 may include and/or represent one or more hardware circuits or circuitry that include, are connected with, or that both include and are connected with one or more processors, controllers, or other hardware logic-based devices. Additionally or alternatively, the control circuit 202 may execute instructions stored on a tangible and non-transitory computer readable medium (e.g., memory 206) to perform one or more operations as described herein. The controller circuit 202 may digitize measurement signals generated by the operation circuit 204. The clock 210 includes a crystal oscillator, which is utilized to generate one or more clocking signals which are received by the controller circuit 202. The controller circuit 202 may utilize the clock 210 to assign a time corresponding to when the measurement signals of the operation circuit 204 were acquired. Based on the clocking signal and the electrical signal, the controller circuit 202 generates measurement data representing a value of the electrical signals at a corresponding time (e.g., sample value) based on the clocking signal. The measurement data may include physiological data, therapeutic data, indicator data, and/or the like based on the type of component endpoint 108. The measurement data may be stored in the memory 206.

The component endpoint 108 includes an authentication circuit 216 that includes an encryption key 220. The encryption key 220 matches an encryption key stored in the registration log 146 (FIG. 2A) in connection with the individual component endpoint 108. For example, at the time of manufacture or assembly, when an individual authentication circuit 216 and encryption key 220 are installed in a component endpoint 108, a unique identifier for the component endpoint 108 (e.g., serial number) is recorded in a registration log 146. The encryption key 220 and type of authentication circuit 216 are also recorded in the registration log 146 with the component endpoint 108 ID. Subsequently, when the component endpoint 108 is installed at a particular medical facility, the component endpoint 108 undergoes a registration process, during which the trusted authentication computing device 130 is informed of the location of the component endpoint 108.

The authentication circuit 216 processes incoming challenges to generate responses based on the corresponding challenge and the encryption key 220. For example, the authentication circuit 216 utilizes the encryption key 220 to apply a cipher to the challenge to calculate the response. The authentication circuit 216 applies the same type of cipher as the authentication circuit 138 (FIG. 2A) at the trusted authentication computing device 130.

The authentication circuit 216 may represent a hardware circuit formed as a discrete chip that has one or more specific authentication algorithms hard-coded thereon. The authentication algorithm represents a challenge-response protocol for an authentication query. The authentication circuit 216 may store a single encryption key hard-coded therein, also referred to as a device-specific key. Optionally, the authentication circuit 216 may store multiple encryption keys hard-coded therein, where one encryption key is selected at the time of manufacture, installation, activation, update or otherwise. Each authentication circuit 216, and/or component endpoint 108, is assigned a unique serial number of ID that is maintained (in a node/key log) at the trusted authentication computing device 130, along with the corresponding encryption key(s). Optionally, the authentication circuit function may be performed by a microprocessor executing an authentication software algorithm rather than via a firmware solution. The trusted authentication computing device 130 accesses the node/key log to determine which encryption key is utilized by a particular component endpoint 108.

Various types of cryptographic ciphers may be applied, such as a secure hash algorithm (SHA) family. Other examples of hash functions include a stream cipher, a block cipher, and the like. A stream cipher encrypts/decrypts digits (e.g., bytes) of a challenge one at a time. A block cipher obtains blocks of the challenge (e.g., a number of bits) and encrypts/decrypts the block as a single unit. Optionally, the blocks may be padded to form a multiple of the block size. Non-limiting examples of symmetric encryption algorithms include Twofish, Serpent, AES, Blowfish, CASTS, Grasshopper, RC4, 3DES, Skipjack, Safter+/++ (Bluetooth), and IDEA. Optionally, asymmetric encryption algorithms may be used.

The controller circuit 202 performs an authentication operation at various points in time. During an authentication operation, the controller circuit 202 receives one or more challenges from the LME node 106 through the communications circuit 212 and/or I/O interface 232. The controller circuit 202 passes the challenge(s) to the authentication circuit 216. The authentication circuit 216 applies the appropriate type of cipher based on the encryption key 220 and generates a corresponding response. The response is passed by the controller circuit 202 and the communications circuit 212 (and/or I/O interface 232), to the LME node. The response is initially referred to as a "candidate" response as the response has not yet been validated. As explained hereafter, the LME node 106 compares candidate responses with valid responses to determine when a component endpoint 108 is authorized or unauthorized for use with the network.

The controller circuit 202 may be operably coupled to, and control, a communication circuit 212, and an input/output (I/O) interface 232. The I/O interface 232 may represent hardware used to form the bi-directional communication links 103-105 (FIG. 1), such as through a lead or other wired connection. The communication circuit 212 may represent hardware that is used to form the bi-directional communication link 104 (FIG. 1). The communication circuit 212 may include a transceiver and associated circuitry (e.g., antennas) 214 for wirelessly communicating (e.g., communicating and/or receiving) with one of the LME nodes 106 based on a network protocol. For example, protocol firmware may be stored in the memory 206 and accessed by the controller circuit 202. The protocol firmware provides the network protocol syntax for the controller circuit 202 to assemble data packets, establish the bi-directional communication link 104, and/or partition data received from one of the LME nodes 106. Additionally or alternatively, the communication circuit 212 may include one or more LEDs to transmit and/or a photodetector to detect light for optical communication. Optionally the communication circuit 212 may include an electric motor configured to generate vibrations for mechanical communication.

In various embodiments, the controller circuit 202 may instruct the communication circuit 212 and/or I/O interface 232 to transmit data packets that includes measurement data to the LME node 106. The measurement data may be formatted into a series of data packets that are continually transmitted by the communication circuit 212 and/or I/O interface 232. Each data packet may include multiple frames based on the network protocol of the link 104. For example, the data packet may include a header that includes network address information of the component endpoint 108 and/or a destination LME node 106 to receive the data packet (e.g., a select LME node-A utilized by the user), timing information (e.g., one or more time stamps), patient information, and/or the like. Additionally, the data packet includes a payload such as the measurement data, patient information, position of the component endpoint 108 relative to the patient and/or the medical network 100, and/or the like. At least some data packets may also include a cipher message combination. Additionally or alternatively, the controller circuit 202 may instruct the communication circuit 212 to transmit data packets having measurement data at multiple acquisition times periodically. For example, the communication circuit 212 may transmit the measurement data at a set transmit interval to one of the LME nodes 106. As another example, the cipher message combination may be added at periodic points to a series of data packets containing measurement data (e.g., daily, hourly, based on each new patient and the like).

Optionally, the controller circuit 202 may instruct the communication circuit 212 to transmit a data packet that contains authentication metadata. The authentication metadata may be combined within the same data packet as other data (e.g., within the measurement data packet) or be transmitted separately.

Figure 2C:
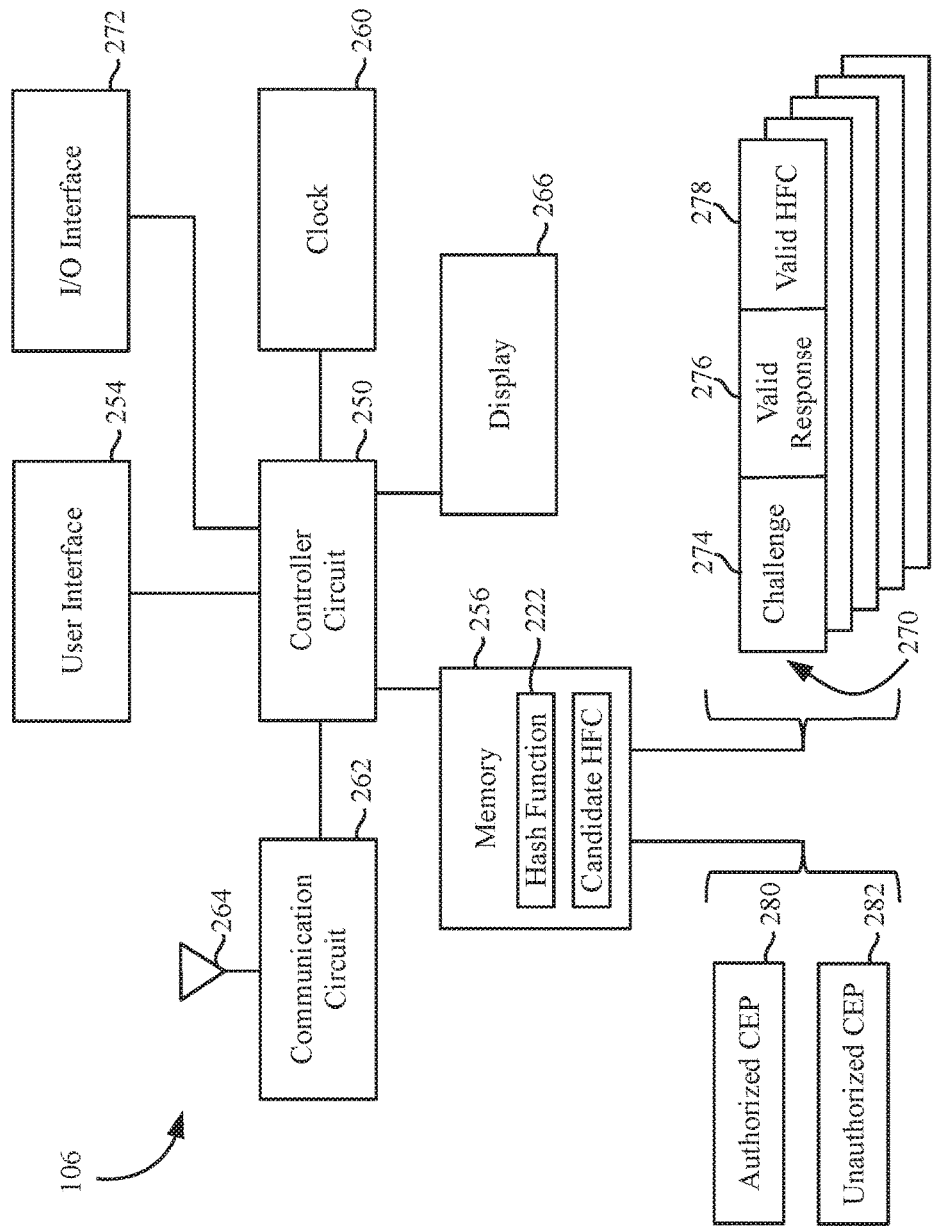
FIG. 2C is a schematic block diagram of a component endpoint formed in accordance with embodiments herein.

FIG. 2C is a schematic block diagram of an LME node 106 (node) formed in accordance with an embodiment. The LME node 106 may be configured as an access point capable of receiving and/or transmitting signals from one or more component endpoints 108, alternative LME nodes 106, and/or the MN computing device 102. The LME node 106 may represent various types of medical equipment that are used in connection with providing medical services to patients, such as patient monitoring, therapy delivery, diagnostic imaging, surgery related equipment and the like. For example, the LME node 106 may represent a patient monitor, an anesthesia machine, a ventilator, life-support equipment, an infusion pump, and the like.

The LME node 106 includes a controller circuit 250 configured to control the operation of the LME node 106. The controller circuit 250 may include and/or represent one or more hardware circuits or circuitry that include, are connected with, or that both include and are connected with one or more processors, controllers, or other hardware logic-based devices. Additionally or alternatively, the controller circuit 250 includes one or more processors that execute instructions stored on a tangible and non-transitory computer readable medium (e.g., memory 256) to perform one or more operations as described herein.

The controller circuit 250 is operably coupled to and controls a communication circuit 262 and an input/output (I/O) interface 272. The I/O interface 272 may represent hardware used to form the bi-directional communication links 103-105 (FIG. 1), such as through a lead or other wired connection. Additionally or alternatively, the communication circuit 262 may represent hardware used to form the bi-directional communication links 103-105 (FIG. 1). The communication circuit 262 may include a transceiver and associated circuitry (e.g., antennas) 264 for wired or wireless communication (e.g., communicating and/or receiving) with one or more component endpoints 108, alternative LME nodes 106, and/or the cloud server 102 based on a network protocol. For example, protocol firmware may be stored in the memory 256, which is accessed by the controller circuit 250. The protocol firmware provides the network protocol syntax for the controller circuit 250 to assemble data packets, establish and/or partition data received along the bi-directional communication links 103-105. Additionally or alternatively, the communication circuit 262 may include one or more LEDs that transmit and/or one or more photo-detectors to detect light for optical communication. Optionally the communication circuit 262 may include an electric motor configured to generate vibrations for mechanical communication.

During operation, measurement data is received through the communication circuit 262 and/or I/O interface 272. The measurement data is stored in the memory 256 until being conveyed to the local medical network computing device 102. The memory 256 also stores one or more cipher message combinations 270. The cipher message combinations 270 are used in connection with authenticating individual component endpoints 108. A cipher message combination 270 includes a challenge 274, and a response 276. Optionally, the cipher message combinations 270 may include a hash function code 278 in addition to or in place of a response 276. By way of example, when the LME node 106 is configured to be connected to a plurality of component endpoints 108, a corresponding number of cipher message combinations 270 may be saved in the memory 256 in order that each component endpoint 108 utilizes a separate unique corresponding cipher message combination 270.

Optionally, the memory 256 may include a hash function 222. The controller circuit 202 may apply the hash function 222 to the response to generate a response hash code (RHC) 224. The hash function 222 corresponds to the hash function 156 performed by the trusted authentication computing device 130 (FIG. 2A). Hashing is the transformation of a string of characters into a usually shorter fixed-length value or key that represents the original string. For example, the hash function 222 may represent a function that maps data of arbitrary size to data of a fixed size. The values returned by the hash function represent a hash function code. By way of example, the hash function 222 may include a hash table that is used as a lookup table to correlates data structures to hash sub-sets. The data structures in the response may be applied to the hash table to form a set of hash sub-sets that collectively form a hash function code that is returned by the controller circuit 250. The controller circuit 250 may also apply hash functions to the candidate responses received from the component endpoints. For example, the memory 256 may store one or more hash functions 222 that are used by the controller circuit 250. When a response is converted, utilizing a hash, the result represents a hash function code (HFC) 224 that is stored in the memory 256. The controller circuit 250 may periodically perform an authentication operation for individual component endpoints 108. When performing an authentication operation, the controller circuit 250 conveys a challenge 274 for a select cipher message combination 270 to the corresponding component endpoint 108. The controller circuit 250 receives and compares a candidate response from the LME 106 with valid responses 276 stored in the memory 256. Additionally or alternatively, the controller circuit 250 receives a candidate response and applies a hash function 222 to the candidate response to form a candidate HFC. The controller circuit 250 then compares the candidate HFC to a valid hash function codes 278 stored in the memory 256.

When the component endpoint 108 returns a candidate response that matches the valid response 276, the controller circuit 250 determines that the component endpoint 108 represents an authorized component. Additionally or alternatively, when the component endpoint 108 returns a candidate response that the controller circuit 250 converts to a candidate HFC that matches a valid HFC, the controller circuit 250 determines that the component endpoint 108 represents an authorized component. In connection there with, the controller circuit 250 adds an identification of the component endpoint 108 to the authorized component endpoint 108 list 280.

Alternatively, when the component endpoint 108 returns a response that does not match the valid response 276 and/or does not convert to a valid hash function code 278, the controller circuit 250 determines that the component endpoint 108 represents an unauthorized component. In connection there with, the controller circuit 250 adds an identification of the component endpoint 108 to the unauthorized component endpoint 108 list 282.

For example, the authorized component endpoint 108 list 280 and unauthorized component endpoint 108 list 282 may include corresponding lists of serial numbers, Mac addresses, or other unique identification information for component endpoints 108 that have been determined to be authorized. The controller circuit 250 may periodically reference the authorized and unauthorized component endpoint 108 lists 280, 282 in connection with verifying whether incoming communications are from an authorized component endpoint 108.

The LME node 106 may include a system clock 260 that defines a time domain of the LME node. The controller circuit 250 may utilize the clock 260 to assign a time corresponding to when operations are performed by the LME node. For example, the controller circuit 250 may utilize the clocking signals of the clock 260 to define timestamps having an internal clock and/or system clock value.

Additionally or alternatively, the controller circuit 250 may be operably coupled to a display 266 and a user interface 254. The display 266 may include one or more liquid crystal displays (e.g., light emitting diode (LED) backlight), organic light emitting diode (OLED) displays, plasma displays, CRT displays, and/or the like. The display 266 may display one or more waveforms based on the measurement data received from one or more component endpoints 108, treatment information of one or more patients, a list of component endpoints 108 communicatively coupled to the LME node, and/or the like. The user interface 254 controls operations of the controller circuit 250 and is configured to receive inputs from a user. The user interface 254 may include a keyboard, a mouse, a touchpad, one or more physical buttons, and/or the like. Optionally, the display 266 may be a touch screen display, which includes at least a portion of the user interface 254.

For example, a portion of the user interface 254 may correspond to a graphical user interface (GUI) generated by the controller circuit 250, which is shown on the display 266. The GUI may include one or more interface components that may be selected, manipulated, and/or activated by the user operating the user interface 254 (e.g., touch screen, keyboard, mouse). The interface components may be presented in varying shapes and colors, such as a graphical or selectable icon, a slide bar, a cursor, and/or the like. Optionally, one or more interface components may include text or symbols, such as a drop-down menu, a toolbar, a menu bar, a title bar, a window (e.g., a pop-up window) and/or the like. Additionally or alternatively, one or more interface components may indicate areas within the GUI for entering or editing information (e.g., patient information, user information, diagnostic information), such as a text box, a text field, and/or the like.

It may be noted, that in various embodiments at least a portion of the LME nodes 106 may not have a display 266 and/or user interface 254. For example, at least a portion of the LME nodes 106 may be a repeater configured to retransmit received data along the bi-directional communication links 103-105.

Figure 3A:
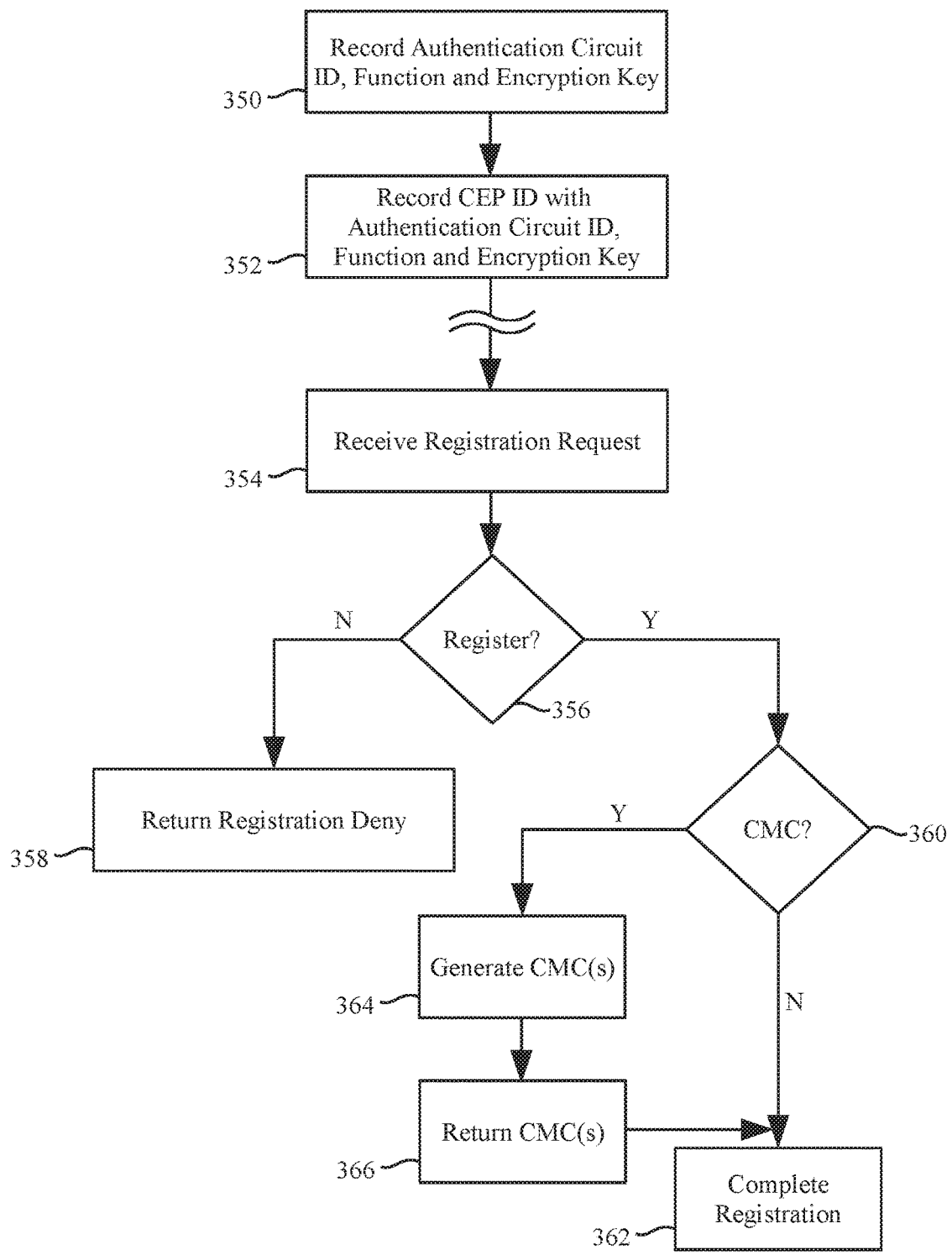
FIG. 3A illustrates a method for generating a log of cipher message combinations for use with component endpoints in accordance with embodiments herein.

FIG. 3A illustrates a method for generating a log of cipher message combinations for use with component endpoints in accordance with embodiments herein. The operations of FIG. 3A may be performed by one or more processors within the various devices, nodes and components described herein. As one example, the operations of FIG. 3A performed by one or more processors at the trusted authentication computing device 130. When an authentication circuit is manufactured, the authentication circuit is assigned an authentication circuit identification (ID). At 350, one or more processors of the trusted authentication computing device record the identification circuit ID in the registration log 146 in memory 140 at the trusted authentication computing device 130. For example, the registration log 146 may maintain a separate record in connection with each authentication circuit that includes, not only the authentication circuit ID, authentication function and encryption key, but also the serial number, credentials, Mac address, and other information related to a component endpoint 108 in which the authentication circuit is installed. The various information related to the record may be added and updated over time. Optionally, the record associated with each authentication circuit may also include hash function information, such as a hash function and/or hash function code. Additionally or alternatively, the hash function may be recorded in memory 256 of an LME node 106 (FIG. 2C) at the time of manufacture, activation, update or otherwise.

Optionally, one or more cipher message combinations may be generated at 350 and recorded in the corresponding record. The cipher message combinations generated at 350 are based on a unique combination of the encryption key, cipher function and authentication circuit.

At 352, one or more processors of the trusted authentication computing device 130 update a record associated with an authentication circuit with a component endpoint ID or serial number designating the component endpoint in which the authentication circuit has been installed. The operations at 350 and 352 are performed for numerous authentication circuits and component endpoints for use with a variety of local medical networks.

At 354, one or more processors of the trusted authentication computing device 130 receive a request for registration. As explained herein, the registration request may be conveyed from a local medical network computing device, a local medical equipment node or otherwise. While the operations of FIG. 3A are described in a successive manner, it is understood that the operations at 350-354 may be carried out at different points in time, in different combinations and in various orders. For example, a trusted authentication computing device 130 may continue to add new authentication circuits and component endpoints, while registering existing authentication circuits and endpoints.

At 356, the trusted authentication computing device 130 determines whether the registration request originated at a valid requester (e.g., LMN computing device 102, LME node 106 and/or component endpoint 108). For example, the trusted authentication computing device 130 may determine whether the registration request includes an authentication circuit ID and/or component endpoint ID that matches a record maintained at the registration log 146. Additionally or alternatively, the trusted authentication computing device 130 may determine whether to authorize the request for registration based on other information, such as the credentials of a node, endpoint or otherwise. When registration is denied, a corresponding response is returned at 358. Alternatively, when registration is authorized, flow moves to 360. At 360, the trusted authentication computing device 130 determines whether one or more cipher message combinations are to be conveyed to the requester (e.g., and LMN computing device, LME node or component endpoint). For example, the registration log 146 may be reviewed to determine whether one or more cipher message combinations already exist at an LME node 106 in connection with the component endpoints 108 available for use with the LME node 106. At 360, when it is determined that no additional cipher message combinations are needed, the registration process is completed. Alternatively, when it is determined that one or more cipher message combinations are needed at an LME node 106 in connection with a new or existing component endpoint 108, flow moves to 364.

At 364, the trusted authentication computing device 130 generates one or more cipher message combinations to be used with an LME node 106 and/or component endpoints 108. For example, when an incoming registration request identifies a single component endpoint 108 that has been added to a network, the corresponding record is accessed from the registration log 146 based on component endpoint ID or authentication circuit ID or otherwise. The corresponding record in the registration log 146 identifies the authentication circuit ID, function and encryption key. Based on the information in the record, the trusted authentication computing device generates one or more cipher message combinations. Additionally or alternatively, the cipher message combinations associated with the individual authentication circuit and/or component endpoint may be stored in the record in the registration log 146.

At 366, the one or more cipher message combinations are returned to the requester. For example, a set of cipher message combinations may be returned to an LMN computing device 102 and/or LME node 106, where each cipher message combination is associated with a unique component endpoint 108 connected to the LME node 106. Alternatively, multiple cipher message combinations may be returned to an LMN computing device 102 and/or LME node 106 that are usable with a single component endpoint 108. Thereafter, the registration process is completed at 362.

Figure 3B:
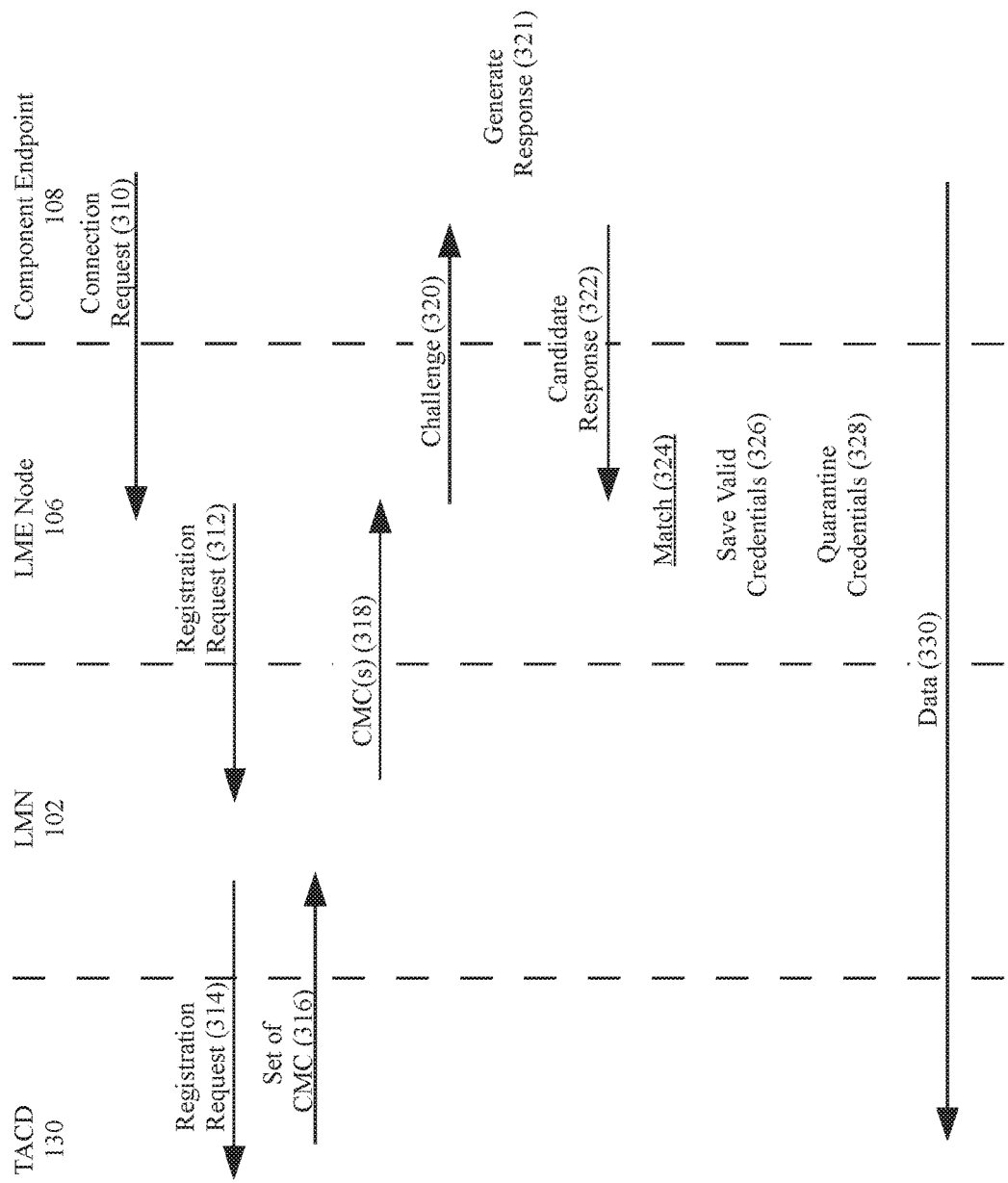
FIG. 3B illustrates a process flow diagram for exchanging information between the devices and equipment in accordance with an embodiment herein.

FIG. 3B illustrates a process flow diagram for exchanging information between the devices and equipment in accordance with an embodiment herein. Within FIG. 3B, the left column corresponds to the trusted authentication computing device 130, the left middle column corresponds to the local medical network computing device 102, the right middle column corresponds to the local medical equipment node 106, and the right column corresponds to a component endpoint 108.

The data exchange illustrated in FIG. 3B corresponds to a circumstance in which the LME node 106 has not yet registered with the trusted authentication computing device 130. When a component endpoint 108 is initially connected or reset, the component endpoint 108 conveys a connection request 310 to the LME node 106. For example, the connection request may be conveyed automatically when the component endpoint 108 is plugged into an input of the LME node. Additionally or alternatively, the connection request may be conveyed when a wireless transmitter in the component endpoint 108 is turned on. The request for a connection may be performed when a new component endpoint 108 is initially placed in use, as well as thereafter, such as following a power outage. A connection request may be generated by the component endpoint 108 each time the LME node 106 is turned off and/or rebooted. Additionally or alternatively, connection requests may be performed periodically or randomly. In the foregoing example, the connection request initiated at the component endpoint 108. Optionally, a connection request may be initiated at the LME node 108. For example, the LME node 106 may detect when a component endpoint 108 is plugged into a physical input or is transmitting an advertisement. In response thereto, the LME node 106 may send a connection request to the component endpoint 108, such as to ask for certain identification and other basic communications information.

When the LME node 106 receives a connection request, the LME node 106 determines whether to implement a registration sequence with the trusted authentication computing device. For example, the registration sequence may be carried out, with the trusted authentication computing device, each time a new component endpoint 108 is added to an LME node. Alternatively, the registration sequence may be only carried out, with the trusted authentication computing device, when an LME node 106 is added to (or reset within) a medical network, and not subsequently repeated for individual component endpoints 108 that are added at later points in time. Additionally or alternatively, the registration sequence may be carried out when an LMN computing device 102 is added to (or reset within) the medical network.

The LME node 106 may determine that a registration sequence is desired based on various criteria. For example, the LME node 106 may store registration credentials for the component endpoint 108. Additionally or alternatively, the LME node 106 may store registration credentials for the LME node 106 and/or the LMN computing device 102. When current, valid registration credentials are saved on the LME node 106 (and/or on the LMN computing device 102), no further registration is warranted. Additionally or alternatively, the LME node 106 may perform the registration sequence when the LME node 106 does not have, stored therein, cipher message combinations available for use with a particular component endpoint 108.

With reference to FIG. 3B, when registration has already occurred, flow jumps from 310 to 320 (as explained below in more detail). Otherwise, flow moves from 310 to 312. In the example of FIG. 3B, the LME node 106 has not yet registered with the trusted authentication computing device 130, and thus the LME node 106 conveys a registration request 312 to LMN computing device 102 which passes the registration request (at 314) to the trusted authentication computing device 130. By way of example, the registration request may include various types of information of interest. For example, the registration request may include a serial number for the LME node 106 and/or component endpoint 108(s), current operating system version on the LME node, healthcare provider identification information, and the like. Optionally, the registration request may include identification information for the component endpoint 108 (serial number, device type, device version, software/firmware version, etc.).

When the trusted authentication computing device 130 receives a registration request (whether in connection with the computing device 102 or node 106), the trusted authentication computing device 130 collects identification information from the LMN computing device 102 and/or node 106. The trusted authentication computing device 130 performs a verification operation based on the information received in the registration request. The trusted authentication computing device 130 determines, based on the identification information, whether the computing device 102 and node 106 are authorized to be registered with the network. If verification fails, the trusted authentication computing device 130 does not complete a registration operation and the process ends. If verification is successful, the trusted authentication computing device 103 generates a set of cipher message combinations, or obtains (from memory) a predetermined set of cipher message combinations. The trusted authentication computing device 130 returns a set of cipher message combinations (at 316). The set of cipher message combinations 318 is conveyed to the LME node. As explained herein, each of the cipher message combinations 318 includes a challenge and a corresponding challenge response. Optionally, in accordance with some embodiments, the cipher message combination may include a challenge and hash response based on a corresponding challenge response. Optionally, the cipher message combination may include the challenge, the hash response and the corresponding challenge response.

The cipher message combinations may be maintained at one or both of the LMN computing device 102 and LME node 106. As explained herein, each cipher message combination may be used with an individual component endpoint 108. Alternatively, a common cipher message combination may be designated for use with multiple component endpoints, such as component endpoints that have a common authentication circuit and encryption key. However, in general, each component endpoint 108 is provided with a unique authentication circuit and encryption key. Accordingly, each component endpoint 108 would utilize a different cipher message combination. The determination of which cipher message combination to use with each component endpoint 108 may be determined at the trusted authentication computing device 130, at the LMN computing device 102 and/or at the LME node 106.

In the example of FIG. 3B, the set of cipher message combinations is maintained at the computing device 102 and at the LME node 106. Optionally, the LMN computing device 102 may maintain the set of cipher message combinations and the LME node 106 only store one or a subset of the cipher message combinations. For example, when a medical network utilizes hundreds of patient monitors (which represent LME nodes), the LMN computing device 102 may store several hundred (or even thousands of) cipher message combinations. When an individual patient monitor is configured to be connected to 5-20 sensors (which represent component endpoints), the patient monitor may store 5-20, or more than 20 cipher message combinations (but fewer cipher message combinations that used by the entire medical network).

The LME node 106 stores the received cipher message combinations. Optionally, the trusted authentication computing device 130 and LMN computing device 102 may undergo an initial cipher exchange process, during which a set of cipher message combinations are passed to the LMN computing device 102. At a later point in time, when an LME node 106 joins the network, the LMN computing device 102 may provide one or more cipher message combinations to the LME node 106 for use with component endpoints 108. Additionally or alternatively, the trusted authentication computing device 130 may provide different subsets of cipher message combinations to different LME nodes 106, such as based upon the type of LME node. For example, a first LME node 106 that is configured as a patient monitor may receive one subset of cipher message combinations, while a second LME node 106 that is configured as an infusion pump may receive a different subset of cipher message combinations.

Continuing with the example of FIG. 3B, the LME node 106 selects a cipher message combination and conveys (at 320) the challenge from the selected cipher message combination to the component endpoint 108. The component endpoint 108 uses the authentication circuit and encryption key therein to generate a response (at 321). The response is treated as a candidate response 320 by the LME node 106. The LME node 106 determines at 322 whether the candidate response matches a valid response associated with the selected cipher message combination. As noted herein, the LME node 106 is unable to calculate independently responses based on challenges, as the LME node 106 does not include an authentication circuit that emulates/mirrors the authentication circuit in the component endpoint 108 and/or the authentication circuit at the trusted authentication computing device 130. When the determination at 324 indicates a match, the LME node 106 saves credentials (at 326) for the component endpoint 108 on a list of valid component endpoints 108. When a match does not occur, the LME node 106 saves the credentials for the component endpoint 108 on a list of quarantined component endpoints 108 (at 328).

When a component endpoint 108 is validated, measurement data 330 from the component endpoint 108 is processed in a desired manner. For example, the data 330 may be passed to the LMN computing device 102 for storage with a corresponding patient record. Additionally or alternatively, the measurement data 330 may be maintained locally at the LME node 106 for display and analysis. Additionally or alternatively, the measurement data 330 may be passed to other servers, storage and the like within the local medical network, remote from the local medical network, to the trusted authentication computing device 130 or elsewhere.

When the component endpoint 108 is designated as quarantined (328), measurement data therefrom is treated as (at least temporarily) unauthorized and unauthenticated and processed accordingly. For example, the component endpoint 108 may be disabled. Alternatively, the component endpoint 108 may be permitted limited operation with measurement data received therefrom being "quarantined" temporarily until further verification or deletion.

While the foregoing example describes the challenge and response exchange in connection with registration, it is recognized that the LME node 106 may perform the local authentication operations at 320-328 at various points in time. For example, the LME node 106 may repeat the local authentication operations at 320-328 periodically or randomly, and compare the returned candidate response to the valid response within the corresponding cipher message combination. The transmission of data at 330 from a component endpoint 108 may occur with or entirely independent of the operations at 320-328.

Figure 3C:
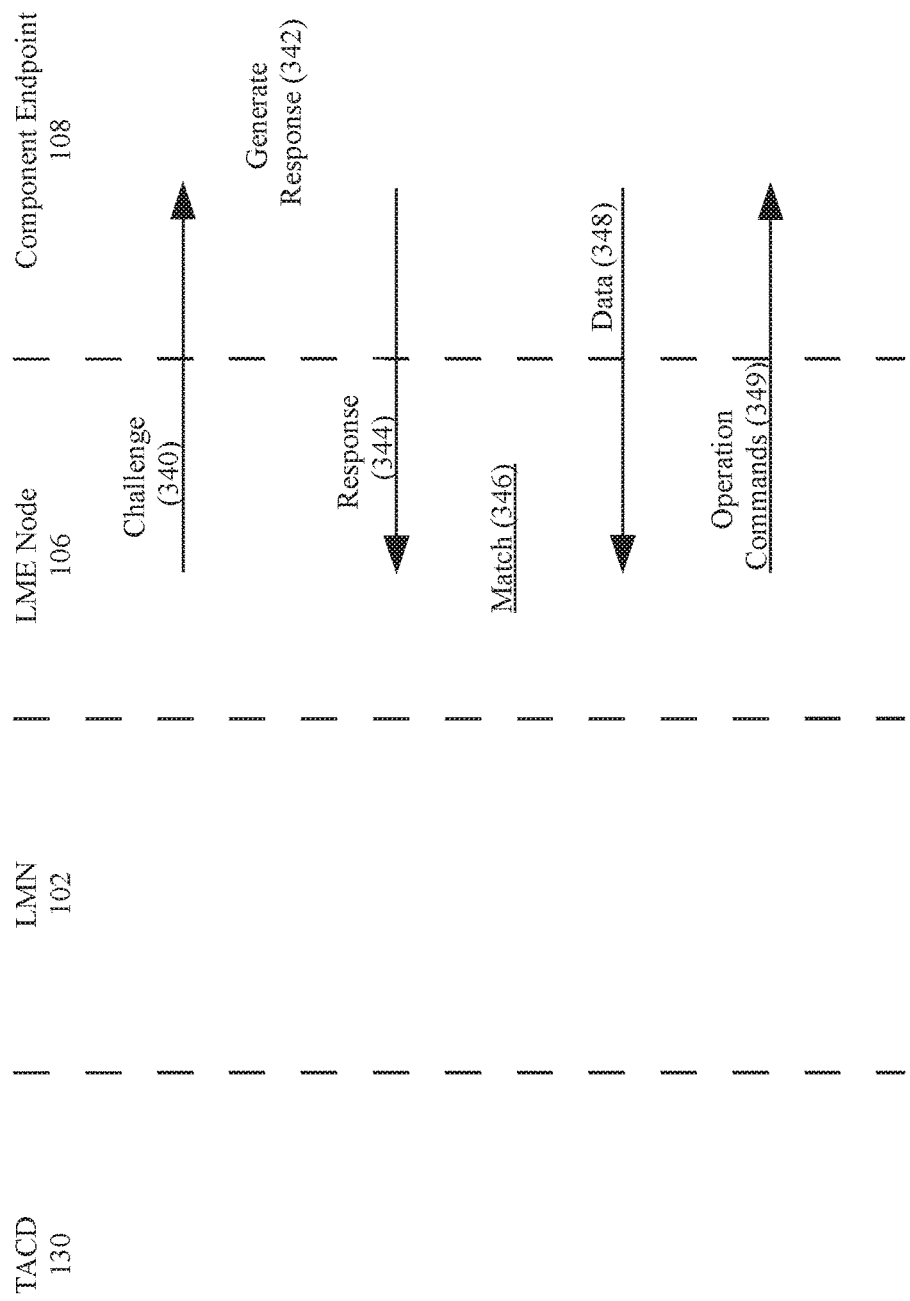
FIG. 3C illustrates a process flow implemented in accordance with an alternative embodiment.

FIG. 3C illustrates a process flow implemented in accordance with an alternative embodiment. Within FIG. 3C, the left column corresponds to the trusted authentication computing device 130, the next column corresponds to the local medical network computing device 102, corresponds to the local medical equipment node 106 and the right column corresponds to a component endpoint 108. The data exchange illustrated in FIG. 3C corresponds to a circumstance in which the LME node 106 has been registered with the trusted authentication computing device 130, and the LME node 106 stores a set of cipher message combinations.

The LME node 106 conveys a challenge (at 340) to the component endpoint 108. The component endpoint 108 generates a response (at 342) which is returned at 344 as a candidate response. The LME node 106 determines (at 346) whether the candidate response 344 matches a valid response stored in the cipher message combinations. When a match occurs, the LME node 106 designates the component endpoint 108 as a valid authorized component endpoint 108.

Thereafter, the measurement data (at 348) from the component endpoint 108 is processed by the LME node 106 in the appropriate manner. Additionally or alternatively, the LME node 106 and component endpoint 108 are utilized in connection with control and operation of medical equipment. For example, the LME node 106 may represent an infusion pump, while the component endpoint 108 represents a switch, valve, actuator and the like. Accordingly, in the example of FIG. 3B, the LME node 106 conveys operation commands at 349 to the component endpoint 108, such as to direct a switch or valve to change position, adjust a flow rate, and the like.

In the foregoing examples, the cipher message combinations are maintained at the LME node 106 and the LME node 106 determines when to send a challenge to a component endpoint 108. Additionally or alternatively, the cipher message combinations may be maintained at the LMN computing device 102, with the LMN computing device 102 determining when to send a challenge and which challenge to send from a set of cipher message combinations. Further, the foregoing examples designate the LME node 106 as the device at which matches are determined between candidate and valid responses. Additionally or alternatively, the LMN computing device 102 may determine whether a match exist between candidate and valid responses. When the LMN computing device 102 determines matches, the challenge may originate at the LMN computing device 102. Alternatively, a challenge originated at the LME node 106 is also passed to the LMN computing device 102. When the LME node 106 receives the candidate response, the LME node 106 relays the candidate response to the LMN computing device 102.

The operations of FIGS. 3A-3C may be carried out by one or more processors of the various devices and components described herein. Additionally or alternatively, the operations of FIGS. 3A-3C may be carried out in firmware, hardware, and/or dedicated circuits.

Figure 4:
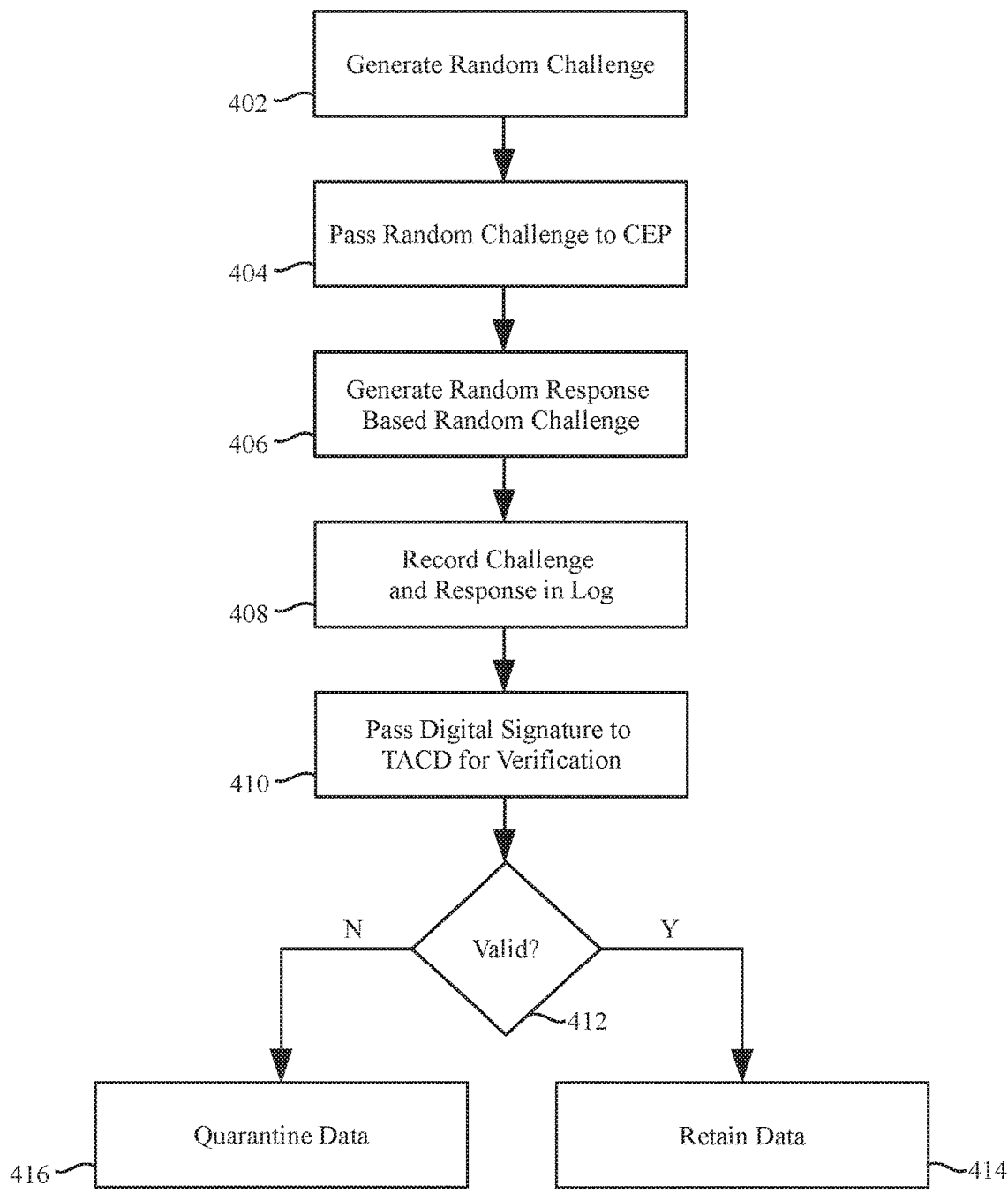
FIG. 4 illustrates a processing flow that may be performed in accordance with various embodiments.

FIG. 4 illustrates a processing flow that may be performed in accordance with various embodiments. At 402, an LME node 106 generates a random challenge. The random challenge is created by the LME node 106 separate from, and independent of, cipher message combinations. The random challenge may represent a random character string, number, text message, and the like; provided that the random challenge is formatted in a common manner as a challenge. For example, when the challenge format (for cipher message combinations) is a 256 bit number, the LME node 106 generates a random challenge that is a 256 bit random number.

At 404, the LME node 106 conveys the random challenge to the component endpoint 108. The LME node 106 may convey the random challenge to the component endpoint 108 at the same time that the LME node 106 sends a challenge from a cipher message combination to the component endpoint 108. Alternatively, the LME node 106 may convey the random challenge at a point in time that is separate and distinct from when the LME node 106 sends challenges from cipher message combinations to the component endpoint 108.

At 406, the component endpoint 108 generates a random response based on the random challenge. At 408, the LME node 106 records a combination of the random challenge and random response in a log (e.g., in memory 256 in FIG. 2C). The combination of the random challenge and corresponding random response represent a digital signature associated with the component endpoint 108. The LME node 106 also stores measurement data and/or operation commands received from and/or sent to the component endpoint 108. The measurement data and/or operation commands are stored in a common or different memory (but in a relation with) the digital signature. For example, the digital signature may be stored in a common file as, or in a relational database associated with, the measurement data collected by the LME node 106 from the corresponding component endpoint 108.

As one example implementation, the LME node 106 may generate a random challenge and receive a corresponding random response when the LME node 106 is unable to verify the authenticity of the component endpoint 108. For example, an LME node 106 may operate for a period of time without cipher message combinations, without registration, and/or without access to a trusted authentication computing device. However, during the period of time when the LME node 106 is operated in an isolated state, the LME node 106 is able to continue to collect measurement data. The digital signature (combination of the random challenge and random response) is logged with the corresponding measurement data for subsequent verification by a trusted authentication computing device 130. Once the LME node 106 gains access to the trusted authentication computing device 130, at 410, the LME node 106 sends the digital signature to the trusted authentication computing device 130. In response thereto, the trusted authentication computing device 130 returns an indication whether the digital signature is indicative of a valid component endpoint 108.

At 412, the LME node 106 determines whether the digital signature has been verified by the trusted authentication computing device 130. When the digital signature is verified, flow passes to 414 where the measurement data is recorded in connection with the patient, such as in a patient record. Alternatively, at 412 when the digital signature is invalid, flow moves to 416. At 416, the measurement data is quarantined and potentially deleted.

Figure 5:
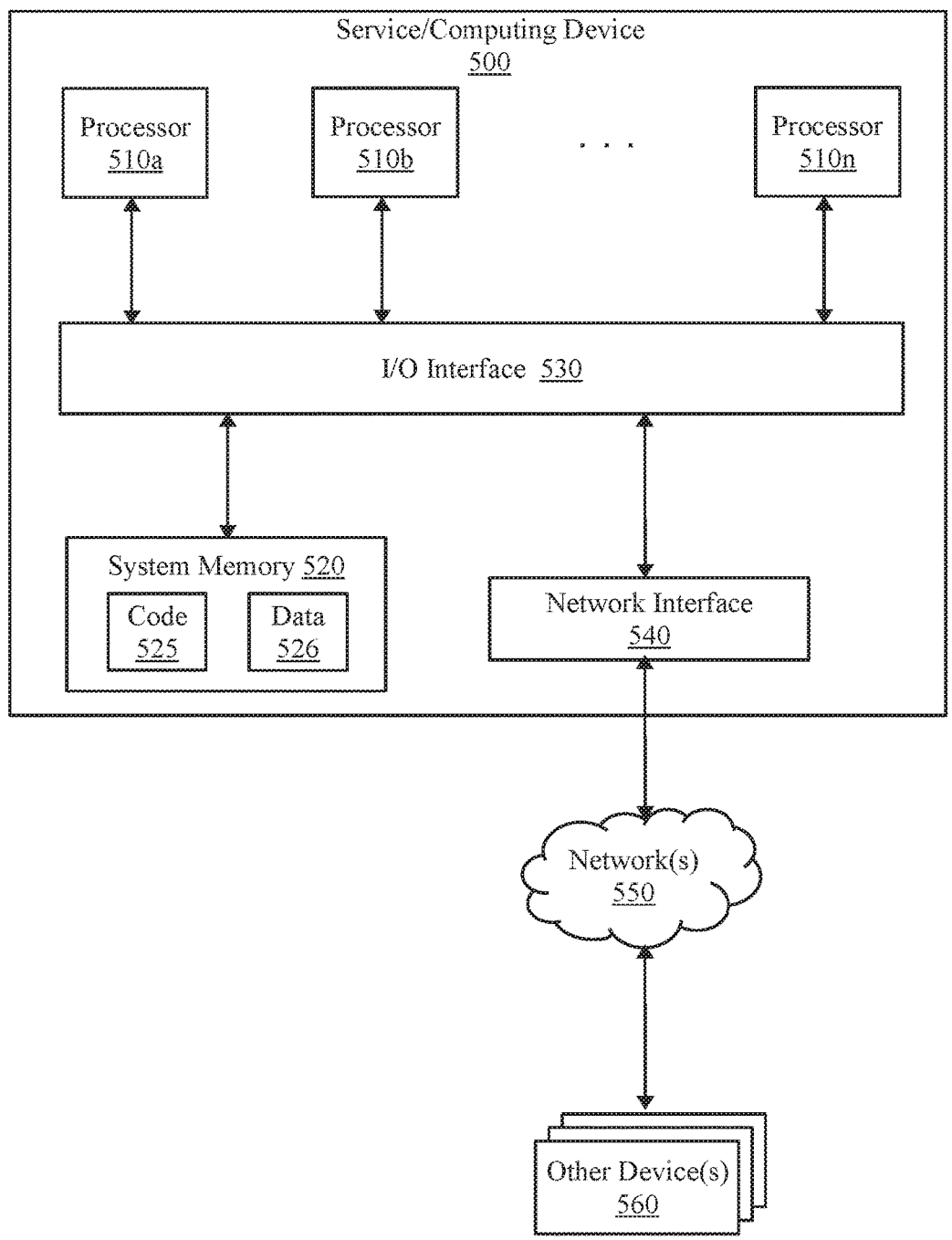
FIG. 5 illustrates a general-purpose computing device that implements some or all of the operations described herein.

FIG. 5 illustrates a general-purpose computing device 500 that implements some or all of the operations described herein. The computing device 500 may be utilized as the trusted authentication computing device (e.g., 130 in FIGS. 1 and 2A), the LMN computing device (e.g., 102 in FIG. 1), and the LME node (e.g., 106 in FIGS. 1 and 2B). In the illustrated embodiment, computing device 500 includes one or more processors 510 coupled to a system memory 520 via an input/output (I/O) interface 530. Computing device 500 further includes a network interface 540 coupled to I/O interface 530. In various embodiments, computing device 500 may be a uniprocessor system including one processor 510 or a multiprocessor system including several processors 510 (e.g., 2, 4, 8 or another suitable number). Processors 510 may include any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, the processors 510 may commonly, but not necessarily, implement the same ISA.

System memory 520 may be configured to store code 525 that includes program instructions that carry out all or a portion of the processes and operations described herein. The system memory 520 also includes data 526 (e.g., the data stored in the memory of FIGS. 2A-2C) accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 520 as code (i.e., program instructions) 525 and data 526.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computing device 500 and other devices 560 attached to a network or networks 550, such as other computer systems or devices as illustrated in the Figures, for example. In various embodiments, network interface 540 may support communication via any suitable wired or wireless general data networks, such as types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 500 via I/O interface 530. A non-transitory computer-readable storage medium may also include any volatile or non-volatile media such as RAM (e.g., SDRAM, DDR SDRAM, RDRAM, SRAM, etc.), ROM, etc., that may be included in some embodiments of computing device 500 as system memory 520 or another type of memory. Further, a computer-readable medium may include transmission media or signals such as electrical, electromagnetic, or digital signals, conveyed via a communication medium such as a network and/or a wireless link, such as may be implemented via network interface 540. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The various methods as illustrated in the FIGS. and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "circuit" or "module" may include a processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term computer," "subsystem," "circuit," or "module." The one or more processors execute a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAIVI) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:
1. A computer implemented method for verifying authenticity of a medical component endpoint, the method comprising:
under control of one or more computer systems configured with specific executable instructions, receive, at a local medical equipment (LME) node, a cipher message combination (CMC) that includes a challenge and a corresponding at least one of a valid response or hash function code (HFC) of a valid response, the LME node unable to independently calculate the valid response;

convey the challenge, from the LME node, to a medical component endpoint that includes an authentication circuit;

receive, at the LME node, a candidate response from the component endpoint, where the candidate response is generated by the authentication circuit based on the challenge;

determine, at the LME node, whether the candidate response corresponds to the at least one of the valid response or HFC from the corresponding cipher message combination; and authenticating, at the LME node, the component endpoint based on whether the candidate response corresponds to the at least one of the valid response or HFC.

2. The method of claim 1, wherein the component endpoint includes at least one of a patient monitoring sensor, an equipment sensor, or an equipment actuator.

3. The method of claim 1, further comprising generating a set of cipher message combinations at a trusted authentication computing device located remote from the LME node, the trusted authentication computing device including an original authentication circuit that emulates the operation of the authentication circuit at the component endpoint.

4. The method of claim 1, further comprising restricting access to the authentication circuit to component endpoint and a trusted authentication computing device.

5. The method of claim 1, further comprising:
receiving measurement data from the component endpoint, the measurement data being indicative of a patient characteristic of interest; and
authenticating the measurement data based on whether the candidate response corresponds to at least one of the valid response or HFC of the cipher message combinations.

6. The method of claim 5, further comprising logging the measurement data, prior to authentication, for a period of time, the measurement data being authenticated after the logging operation.

7. The method of claim 1, further comprising calculating from the candidate response, a candidate HFC, and comparing candidate HFC to the HFC for the valid response.

8. The method of claim 1, further comprising transmitting, from the component endpoint, a connection request and serial number to at least one of the LME node or a local medical network computing device during a registration sequence.

9. The method of claim 1, further comprising registering the LME node with a trusted authentication (TA) computing device, the TA computing device providing the cipher message combination to the LME node.

10. A system for verifying authenticity of a medical component endpoint, the system comprising:
a local medical equipment (LEM) node comprising memory, one or more processors and an input/output (I/O) interface configured to be coupled to a medical component endpoint configured to perform at least one of: i) collect measurement data and ii) perform actions based on incoming operation commands;
the memory configured to store a cipher message combination that includes a challenge and a corresponding valid response, wherein the valid response corresponds to a calculation performed by an authentication circuit based on the challenge;
the one or more processors configured with specific executable instructions, to:
convey the challenge to the component endpoint that includes an authentication circuit, the authentication circuit;
receive a candidate response from the component endpoint;
determine whether the candidate response corresponds to at least one of the valid response or HFC from the corresponding cipher message combination; and
authenticating the component endpoint based on whether the candidate and valid responses match, wherein the one or more processors are unable to independently calculate the at least one of the valid response or HFC.

11. The system of claim 10, further comprising a component endpoint that represents at least one of a patient monitoring sensor, an equipment sensor, or an equipment actuator.

12. The system of claim 10, further comprising a trusted authentication computing device configured to generate the cipher message combination, the trusted authentication computing device located remotely from the one or more processors, the trusted authentication computing device including an original authentication circuit that emulates the operation of an authentication circuit at a valid component endpoint.

13. The system of claim 10, further comprising a trusted authentication computing device and a valid component endpoint, that includes a common authentication circuit, the memory and one or more processors being housed within a local medical equipment (LME) node that does not have an authentication circuit corresponding to the common authentication circuit in the component endpoint and a trusted authentication computing device.

14. The system of claim 10, wherein the one or more processors is further configured to:
receive measurement data from the component endpoint, the measurement data being indicative of a patient characteristic of interest; and
authenticate the measurement data based on whether the candidate response corresponds to the at least one of the valid response or HFC of the cipher message combinations.

15. The system of claim 14, wherein the one or more processors is further configured to log the measurement data, prior to authentication, for a period of time, the measurement data being authenticated after the logging operation.

16. The system of claim 10, wherein the candidate response represents a response hash code calculated based on a response key generated by the authentication circuit.

17. The system of claim 10, wherein the one or more processors is further configured to receive, from the component endpoint, a connection request and serial number during a registration sequence.

18. The system of claim 10, wherein the one or more processors is further configured comprising registering a local medical equipment (LME) node with a trusted authentication (TA) computing device, the TA computing device providing the cipher message combination to the LME node, the LME node including the one or more processors and memory.

19. The system of claim 10, wherein the memory is configured to store a plurality of cipher message combinations that includes challenges and corresponding valid responses multiple component endpoints.

20. The system of claim 10, wherein the authentication circuit comprises a microprocessor executing an authentication software algorithm.

* * * * *